United States Patent
Eberl et al.

(10) Patent No.: US 12,275,389 B2
(45) Date of Patent: Apr. 15, 2025

(54) CONTROL UNIT FOR PROVIDING A ONE-PEDAL FEEL AND/OR A CREEP FUNCTION

(71) Applicant: Bayerische Motoren Werke Aktiengesellschaft, Munich (DE)

(72) Inventors: Thomas Eberl, Sauerlach (DE); Werner Foag, Munich (DE); Andreas Rank, Olching (DE); Florian Schnappauf, Hattenhofen (DE); Ralf Seibert, Neusaess (DE); Georg Soyer, Fischbachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 568 days.

(21) Appl. No.: 17/419,359

(22) PCT Filed: Jan. 14, 2020

(86) PCT No.: PCT/EP2020/050779
§ 371 (c)(1),
(2) Date: Jun. 29, 2021

(87) PCT Pub. No.: WO2020/164831
PCT Pub. Date: Aug. 20, 2020

(65) Prior Publication Data
US 2022/0080942 A1 Mar. 17, 2022

(30) Foreign Application Priority Data

Feb. 11, 2019 (DE) .................... 10 2019 103 375.6

(51) Int. Cl.
*B60T 7/04* (2006.01)
*B60T 1/10* (2006.01)
(Continued)

(52) U.S. Cl.
CPC ............... *B60W 10/08* (2013.01); *B60T 1/10* (2013.01); *B60T 7/04* (2013.01); *B60T 13/586* (2013.01);
(Continued)

(58) Field of Classification Search
CPC ..... B60T 1/10; B60T 7/04; B60T 7/06; B60T 13/585; B60T 13/586; B60T 2270/60;
(Continued)

(56) References Cited

U.S. PATENT DOCUMENTS 6,378,636 B1 * 4/2002 Worrel .................. B60T 17/221
180/65.25
2013/0197731 A1 * 8/2013 Schum ................ B60L 15/2063
701/22
(Continued)

FOREIGN PATENT DOCUMENTS

CN 102414069 A 4/2012
CN 104553822 A 4/2015
(Continued)

OTHER PUBLICATIONS

Machine translation JP 2008-245517 A (Year: 2008).*
(Continued)

*Primary Examiner* — Thomas J Williams
(74) *Attorney, Agent, or Firm* — Crowell and Moring LLP (57) ABSTRACT

A control unit for a motor vehicle which includes at least one electric machine for driving one or more wheels of the vehicle and at least one friction brake is provided. The control unit is configured to determine that a one-pedal feel function is to be provided via an acceleration pedal of the vehicle and/or a creep function is to be provided via a brake pedal of the vehicle. Additionally, the control unit is configured to operate the electric machine at least temporarily in (Continued)

combination with the friction brake in order to provide the one-pedal feel function and/or the creep function.

11 Claims, 4 Drawing Sheets

(51) Int. Cl.
  *B60T 13/58* (2006.01)
  *B60W 10/08* (2006.01)
  *B60W 30/18* (2012.01)

(52) U.S. Cl.
  CPC  *B60W 30/18063* (2013.01); *B60W 30/18127* (2013.01); *B60T 2270/604* (2013.01); *B60W 2540/12* (2013.01)

(58) Field of Classification Search
  CPC ............. B60T 2270/604; B60W 10/08; B60W 30/18063; B60W 30/18127
  See application file for complete search history.

(56) References Cited

U.S. PATENT DOCUMENTS

| | | | |
|---|---|---|---|
| 2014/0129068 A1* | 5/2014 | Higa | B60K 6/445 |
| | | | 701/1 |
| 2016/0264020 A1 | 9/2016 | Ochocinski et al. | |
| 2017/0361827 A1* | 12/2017 | Crombez | B60W 20/00 |
| 2018/0134298 A1* | 5/2018 | Johri | B60W 30/18063 |
| 2018/0370385 A1 | 12/2018 | Strasser | |
| 2018/0370534 A1 | 12/2018 | Bemetz et al. | |
| 2019/0381895 A1 | 12/2019 | Shindo et al. | |
| 2022/0080942 A1* | 3/2022 | Eberl | B60W 50/10 |

FOREIGN PATENT DOCUMENTS

| | | |
|---|---|---|
| CN | 105946621 A | 9/2016 |
| CN | 108430849 A | 8/2018 |
| EP | 2 433 843 A1 | 3/2012 |
| JP | 2008-245517 A | 10/2008 |
| JP | 2015-30427 A | 2/2015 |
| JP | 2017-47746 A | 3/2017 |
| WO | WO 2018/139270 A1 | 8/2018 |

OTHER PUBLICATIONS

Chinese-language Office Action issued in Chinese Application No. 202080008105.5 dated May 18, 2023 with English translation (21 pages).
International Search Report (PCT/ISA/210) issued in PCT Application No. PCT/EP2020/050779 dated Mar. 2, 2020 with English translation (seven (7) pages).
German-language Written Opinion (PCT/ISA/237) issued in PCT Application No. PCT/EP2020/050779 dated Mar. 2, 2020 (eight (8) pages).
German-language Search Report issued in German Application No. 10 2019 103 375.6 dated Sep. 6, 2019 with a partial English translation (12 pages).
Nissan, "New Nissan LEAF with e-Pedal Premieres September 6", Jul. 19, 2017, pp. 1-4, XP054980244, https:/www.youtube.com/watch?v=V350PLWLCcc&feature=youtu.be.
Nissan, "The New Nissan LEAF, combining greater range and advanced technologies", Sep. 5, 2017, pp. 1-4, XP054980245, https:/www.youtube.com/watch?v=DCcGlkd4tQo&feature=youtu.be.
Anonymous, "Nissan Leaf—Wikipedia", Feb. 19, 2020, XP055670442.
Nissan, "e-Pedal: Easy driving using only the accelerator pedal", Dec. 6, 2017, XP055669748.
Erick Fontaine, "Nissan Leaf : une e-Pedal pour accelerer, freiner et recharger—Les Numeriques", Jul. 22, 2017, XP055670328.
Nissan, "2018 LEAF owner's manual", Jan. 11, 2019, XP055670539.

\* cited by examiner

CONTROL UNIT FOR PROVIDING A ONE-PEDAL FEEL AND/OR A CREEP FUNCTION

BACKGROUND AND SUMMARY OF THE INVENTION

The invention relates to an at least partially electrically driven motor vehicle. In particular, the invention relates to the operation of a motor vehicle during a stopping process, holding process and/or starting up process by a one-pedal-feel function and/or a creep function.

An at least partially electrically driven vehicle, in particular a battery-operated electric vehicle (referred to as a battery electric vehicle, BEV) or an E-axle-coupled hybrid vehicle, comprises an electric machine which is configured to drive the vehicle. The electric machine can also be used to decelerate the vehicle.

In order to increase the driving comfort it can be advantageous to provide, in a vehicle, what is referred to as a "one-pedal-feel" function in which both acceleration and deceleration of the vehicle can be brought about by using the accelerator pedal of the vehicle, without activating the brake pedal. Alternatively or additionally it can be advantageous to permit creeping of the vehicle at relatively low velocities, even in the case of a (under certain circumstances purely) electrically driven vehicle. The creep speed of the vehicle should be able to be advantageously reduced here in a comfortable way (e.g., solely) by using the brake pedal of the vehicle. Such a one-pedal-feel function and/or such a creep function are advantageous in particular at relatively low velocities (e.g. 15 km/h or less or 10 km/h or less) for a stopping process, holding process and/or a starting up process of the vehicle.

The present document is concerned with the technical problem of making possible, in an at least partially or completely electrically driven vehicle, a comfortable and/or energy-efficient one-pedal-feel function and/or creep function, in particular when the vehicle is operating on an inclined roadway.

The problem is solved by the claimed invention.

According to one aspect, a control unit is described for a motor vehicle (e.g. for a passenger car or a truck or a bus). The vehicle comprises at least one electric machine for driving one or more wheels and/or for driving one or more axles of the vehicle. Furthermore, the vehicle comprises at least one (in particular pedal-decoupled) friction brake which is configured to brake the vehicle and, in particular, the one or more wheels of the vehicle. In other words, the friction brake can be capable of being operated, under certain circumstances, independently of a brake pedal of the vehicle. In particular, the friction brake can be embodied in such a way that the friction brake can be activated (in order to generate a braking torque), even if the brake pedal is not activated. Furthermore, the friction brake can be embodied in such a way that the friction brake is under certain circumstances not activated (and therefore also generates no braking torque) even if the brake pedal is activated. The brake can be e.g. what is referred to as a "brake-by-wire" friction brake.

The control unit can be configured to determine that a one-pedal-feel function is to be provided via an accelerator pedal of the vehicle and/or that a creep function is to be provided via a brake pedal of the vehicle. The one-pedal-feel function can make it possible for the driver of the vehicle to accelerate or decelerate the vehicle by changing the deflection of the brake pedal (without activating the brake pedal). In particular, it can be made possible for the driver of the vehicle to decelerate the vehicle to a stationary state by reducing the deflection of the brake pedal to zero (i.e. by taking his foot off the brake pedal). A comfortable stopping and/or holding function of a vehicle can therefore be made possible by the one-pedal-feel function.

The creep function can make it possible for the driver of the vehicle to guide the vehicle longitudinally without activating the accelerator pedal with a specific relatively low (maximum) creep speed (e.g. 10 km/h or less). The brake pedal can be used (without activating the accelerator pedal) to reduce the creep speed of the vehicle further (under certain circumstances to the stationary state of the vehicle). It can therefore be made possible for the driver of a (under certain circumstances purely) electrically driven vehicle to use the creeping which is known in a vehicle which is driven by a combustion engine (and is brought about by the idling speed of the combustion engine).

The vehicle can have a user interface (e.g. with one or more switches or pushbutton keys) which permits the driver of the vehicle to activate or deactivate the one-pedal-feel function and/or the creep function. It is therefore possible to determine, on the basis of a setting at the user interface of the vehicle, whether the one-pedal-feel function and/or the creep function is to be provided or not.

Furthermore, the control unit can be configured to operate the electric machine and the friction brake in combination at least in certain times, in order to provide the one-pedal-feel function and/or the creep function. Through the combined use of the electric machine and of the friction brake of a vehicle for providing a pedal-feel function and/or a creep function it is possible to increase the comfort and/or the energy efficiency of the vehicle.

The control unit can be configured to acquire inclination information relating to the inclination of a roadway which is traveled on by the vehicle. The inclination information can be acquired e.g. by an inclination sensor of the vehicle. In particular, the inclination information can indicate negative gradient forces which act on the vehicle (and therefore change the acceleration behavior or deceleration behavior of the vehicle).

Furthermore, the control unit can be configured to operate the electric machine and/or the friction brake in accordance with the inclination information, in order to provide the one-pedal-feel function and/or the creep function. In this context, the electric machine and/or the friction brake can, in particular, be operated in such a way that the inclination of the roadway is at least partially compensated during the operation of the one-pedal-feel function and/or during the operation of the creep function. In other words, the electric machine and/or the friction brake can be operated in such a way that during the operation of the one-pedal-feel function and/or of the creep function the vehicle essentially also behaves on such an inclined roadway as the vehicle would on a horizontal roadway. By taking into account inclination information, the comfort and/or the energy efficiency of a vehicle can be further increased during the operation of the one-pedal-feel function and/or of the creep function.

The control unit can be configured to operate the electric machine and/or the friction brake within the scope of the creep function in accordance with the inclination information in such a way that when the accelerator pedal is not activated and when the brake pedal is not activated the vehicle travels at a specific (maximum) creep speed independently of the inclination of the roadway, at least within a limited inclination range. In this context, the limited inclination range can be limited to inclinations which are in absolute terms 7% or less or 5% or less. Outside the limited inclination range it is at least partially or completely possible to dispense with the compensation of the inclination of the roadway. A particularly comfortable creep function can be provided by compensating the inclination of the roadway within a limited inclination range.

Alternatively or additionally, the control unit can be configured to operate within the scope of the one-pedal-feel function the electric machine and/or the friction brake in accordance with the inclination information in such a way that when the brake pedal is not activated the vehicle is decelerated to a stationary state and held in a stationary state, at least within the limited inclination range, when the driver takes his foot off the accelerator pedal. The deceleration of the vehicle can occur here with a uniform deceleration profile over time which is (essentially) independent of the inclination of the roadway. Alternatively, a deceleration profile can occur which is dependent on the inclination of the roadway. Outside the limited inclination range, it is possible to dispense, at least partially or completely, with the compensation of the inclination of the roadway. A particularly comfortable one-pedal-feel function can be provided by taking into account the inclination information.

In order to provide the one-pedal-feel function, the control unit can be configured to acquire deflection information relating to the deflection of the accelerator pedal of the vehicle. Furthermore, it is possible to determine, on the basis of the deflection information, that the vehicle is to be decelerated. In particular, by reducing the deflection of the accelerator pedal it is possible to cause the vehicle to be decelerated. The electric machine and the friction brake can then both be operated in a coordinated fashion, in order to decelerate the vehicle. The comfort and the energy efficiency of the vehicle can be increased (in particular when traveling on an inclined roadway) through the coordinated deceleration of the vehicle by using the electric machine and the friction brake.

The control unit can be configured to acquire, in accordance with the deflection information, a setpoint deceleration torque which is to be provided within the scope of the one-pedal-feel function (e.g. in order to decelerate the vehicle to a stationary state and/or in order to hold the vehicle in a stationary state).

It can be determined that, for a technical reason and/or for an efficiency reason, the setpoint deceleration torque can at least partially not be provided by the electric machine. In particular it can be ascertained that the setpoint deceleration torque exceeds the maximum torque which can be provided technically or in an energy-efficient fashion by the electric machine. In reaction thereto, the friction brake can then be made to bring about a braking torque in order to (at least partially or precisely) make available the portion of the setpoint deceleration torque which, for the technical reason and/or for the efficiency reason, cannot be provided by the electric machine. The friction brake can therefore be used to compensate technical limitations and/or efficiency limitations of the electric machine, in order to increase the comfort and/or the energy efficiency of the one-pedal-feel function.

The control unit can be configured to determine, on the basis of the deflection information relating to the deflection of the brake pedal, that the vehicle is to be decelerated to a stationary state. It is then possible to acquire a time profile of the setpoint torque which is to be provided over time by the electric machine and/or by the friction brake, in order to decelerate the vehicle to a stationary state. The setpoint torque can depend here on the inclination information relating to the inclination of the roadway.

Furthermore, the control unit can be configured to acquire a first time profile of a deceleration torque which can be technically provided by the electric machine, and/or to acquire a second time profile of a deceleration torque, which can be provided in an energy-efficient fashion by the electric machine. In accordance with the time profile of the setpoint torque and in accordance with the first time profile and/or in accordance with the second time profile, one or more time intervals can then be determined during the stopping and/or holding process in which the friction brake is activated in addition to the electric machine or as an alternative to the electric machine, in order to bring the vehicle to a stationary state or hold it in a stationary state. The friction brake can be used to compensate technical limitations and/or efficiency limitations of the electric machine during the implementation of a time deceleration profile, in order to increase the comfort and/or the energy efficiency of the one-pedal-feel function.

In order to provide the creep function, the control unit can be configured to acquire the deflection information relating to the deflection of the brake pedal of the vehicle. Furthermore, the control unit can be configured to change, in accordance with the deflection information, a drive torque, provided by the electric machine, between a creep torque, during which the vehicle has a maximum possible creep speed, and a minimum torque, during which the vehicle has a reduced velocity in comparison with the maximum possible creep speed, or in which the vehicle is stationary. The creep torque and/or the minimum torque can thus depend on the inclination information. The minimum torque can be, under certain circumstances, also negative here (e.g. in the case of downhill travel).

The activation of the brake pedal can therefore be used to vary a drive torque which is provided by the electric machine within the scope of the creep function. The changing of the creep speed of the vehicle (by changing the deflection of the brake pedal without activating the accelerator pedal) can therefore under certain circumstances occur solely by changing the drive torque of the electric machine (without activating a friction brake of the vehicle). A creep function can therefore be made available in a particularly energy-efficient fashion in a (under certain circumstances purely) electrically driven vehicle.

The control unit can be configured not to activate the friction brake (within the scope of the creep function) to generate a braking torque until the deflection information relating to the deflection of the brake pedal indicates that the vehicle is to travel more slowly than at the velocity which can be reached with the minimum torque, and/or if the deflection information relating to the deflection of the brake pedal indicates that the vehicle is to be held in a stationary state. The comfort and/or the energy efficiency of the creep function can therefore be increased further.

The control unit can be configured to predict a time at which a driver of the vehicle will activate the accelerator pedal again in order to accelerate the vehicle again starting from a stationary state of the vehicle. It is therefore possible to predict the time of a starting up process. The time can be predicted e.g. on the basis of surroundings data relating to an area surrounding the vehicle. For example, the surroundings data can indicate a vehicle in front which is arranged in front of the vehicle. If it is detected that the vehicle in front starts up, it can be inferred therefrom that the driver of the vehicle will activate the accelerator pedal in the near future, in order to accelerate the vehicle (i.e. in order to start the starting up process). If a starting up process or a starting up time is predicted, a changeover from the friction brake to the electric machine can already take place in advance (in order to generate the holding torque), so as to permit comfortable starting up.

Furthermore, the control unit can be configured to use, the friction brake (under certain circumstances in addition to and/or as an alternative to the electric machine) in accordance with the predicted time to transfer the vehicle into the stationary state and/or hold it in the stationary state. In particular, on the basis of the predicted time of the re-start it is possible to ascertain whether it is advantageous for comfort reasons or efficiency reasons to activate the friction brake, or whether it is advantageous to decelerate or hold solely by using the electric machine. By way of the prediction of the re-start time it is therefore possible to increase the comfort and/or the energy efficiency of the vehicle further.

Furthermore, the control unit can be configured to determine in accordance with the predicted time, whether to transfer at least partially from the electric machine to the friction brake and/or in accordance with the predicted time to acquire a time at which blending back occurs again from the friction brake to the electric machine. In this way the comfort of a vehicle can be increased.

Alternatively or additionally, the control unit can be configured to predict whether the drive wishes to stop the vehicle or not. Furthermore, a stopping time and/or a stopping period can be predicted. It is then possible to select a suitable stopping scenario in accordance with whether it has been predicted whether the driver wishes to stop the vehicle or not and/or in accordance with the stopping time and/or the stopping period. For example, it can be decided in accordance with the predicted information whether a changeover to the friction brake takes place or whether further braking (under certain circumstances solely) occurs with the electric brake (e.g. since it has only been predicted for a relatively short stopping process and therefore a comfortable re-start is to be made possible).

The control unit can be configured to acquire user information relating to a user, in particular relating to the driver, of the vehicle. The user information can indicate e.g. whether the user of the vehicle would like to use the one-pedal-feel function and/or the creep function or not. Alternatively or additionally, the user information can indicate an intention of the user of the vehicle relating to a future driving maneuver (in particular relating to a re-start). Alternatively or additionally, the user information can indicate a preference of the user relating to the energy efficiency or comfort.

The control unit can then be configured to operate the electric machine and the friction brake in accordance with the user information, in particular in order to provide the one-pedal-feel function and/or the creep function. The comfort for a user can therefore be increased further.

According to a further aspect, a (road) motor vehicle (in particular a passenger car or a truck or a bus) is described which comprises the control unit described in this document. Furthermore, the motor vehicle can have at least one electric machine for driving the vehicle. On the other hand, the motor vehicle can, if appropriate, not have a combustion engine which is used to generate a drive torque for driving the vehicle.

According to a further aspect, a method which corresponds to the control unit described in this document is described.

According to a further aspect, a software (SW) program is described. The SW program can be configured to be run on a processor (e.g. on a control device of a vehicle) and as a result to execute the method described in this document.

According to a further aspect, a storage medium is described. The storage medium can comprise a SW program which is configured to be run on a processor and to execute the method described in this document.

It is to be noted that the methods, devices and systems described in this document can be used alone, as well as in combination with other methods, devices and systems described in this document. Furthermore, any aspects of the methods, devices and systems which are described in this document can be combined with one another in various ways. The features of the claims can in particular be combined with one another in various ways.

In the text which follows, the invention will be described in more detail with reference to exemplary embodiments.

DETAILED DESCRIPTION OF THE DRAWINGS

Figure 1:
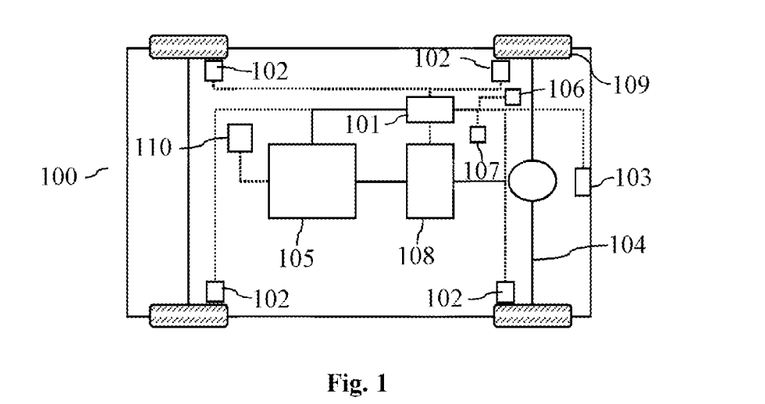
FIG. 1 shows exemplary components of an at least partially electrically driven vehicle.

As stated at the beginning, the present document is concerned with providing a one-pedal-feel function and/or a creep function of a vehicle which is operated electrically at least partially and/or at certain times completely. In this context, FIG. 1 shows exemplary components of a vehicle 100. The vehicle 100 comprises an electric machine 105 which is configured to drive, under certain circumstances, one or more axles 104 and/or wheels 109 of the vehicle 100 via a transmission 108. The electric machine 105 can be operated with electrical energy from an electrical energy store 110.

On the other hand, the electric machine 105 can be used to decelerate the vehicle 100. In this context, the electric machine 105 can be operated, in particular, as a generator which is driven by one or more wheels 109 of the vehicle 100. Furthermore, the vehicle 100 typically has one or more friction brakes 102 for one or more wheels 109 of the vehicle 100. In this context, a friction brake 102 is configured to bring about a braking torque at a wheel 109 of the vehicle 100, in order to brake the vehicle 100 and/or in order to act against a proportion force of the vehicle 100, e.g. in order to act against a downgrade force acting on the vehicle 100.

The vehicle 100 typically comprises an accelerator pedal 107 which can be activated by a user of the vehicle 100, in order to cause the electric machine 105 to bring about a drive torque at one or more wheels 109 of the vehicle 100. Furthermore, the vehicle 100 typically comprises a brake pedal 106 which can be activated by a user of the vehicle 100, in order to cause one or more friction brakes 102 to bring about a braking torque at one or more wheels of the vehicle 100.

In order to increase the driving comfort it may be advantageous to provide what is referred to as a one-pedal-feel via the accelerator pedal 107. In this context, a user of the vehicle 100 can bring about a braking torque on one or more wheels 109 of the vehicle 100 within the scope of the "one-pedal-feel" function by reducing the deflection of the accelerator pedal 107. By increasing the deflection of the accelerator pedal 107 it is typically possible to bring about a drive torque at one or more wheels 109 of the vehicle 100 and/or to reduce the braking torque. In particular, in this context an acceleration and an (active) deceleration of the vehicle 100 can be brought about by activating the accelerator pedal 107 (and without activating the brake pedal 106). The drive torques and braking torques can, under certain circumstances, be brought about here solely by using the electric machine 105 (and under certain circumstances not by using the one or more friction brakes 102).

Alternatively or additionally, controllable creeping can be provided in a vehicle 100 in order to increase the driving comfort for a user of the vehicle 100 in the case of travel at a relatively low velocity (e.g. of 10 km/h or less or of 5 km/h or less). The drive torque for the creeping can be brought about here (at least partially or completely) by the electric machine 105. The creep function can be used to model the creep functionality of a vehicle 100 which is driven with a combustion engine.

A user can be enabled to reduce the creep speed by activating the brake pedal 106. In particular, by activating the brake pedal 106, the one or more friction brakes 102 can be made to bring about a braking torque at the one or more wheels 109 of the vehicle 100, in order to reduce the creep speed of the vehicle 100.

The vehicle 100 can make it possible, via a user interface of the vehicle 100 (e.g. via a driving experience switch), to place the vehicle 100 in a "one-pedal-feel" mode and/or in a "creep" mode, in order to provide the "one-pedal-feel" function and/or "creep" function.

In particular when traveling on an inclined roadway it is possible for the provision of a one-pedal-feel function solely on the basis of the electric machine 105 to be energetically inefficient and/or uncomfortable. In an analogous fashion, in particular when driving on an inclined roadway, the adaptation of the creep speed of a vehicle 100 solely on the basis of the one or more friction brakes 102 can be energetically inefficient and/or uncomfortable.

Figure 2:
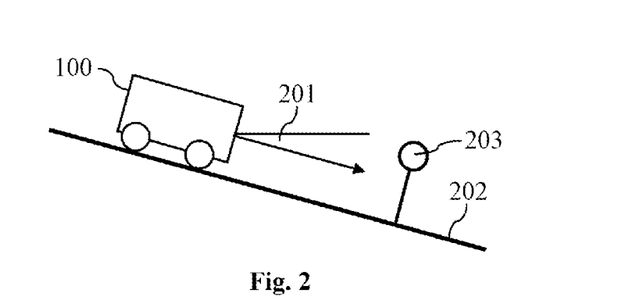
FIG. 2 shows an exemplary vehicle on an inclined roadway.

FIG. 2 shows an exemplary driving situation in which a vehicle 100 on an inclined, in particular a sloping, roadway 202 approaches a stop sign 203. Furthermore, FIG. 2 shows the inclination angle or the inclination 201 of the roadway 202. The aspects described in this document are described in a way which is exemplary for a sloping roadway 202, but they can also be applied correspondingly to a rising roadway 202.

A driver of the vehicle 100 can use the one-pedal-feel function and/or the creep function to guide the vehicle 100 in a comfortable way to the stop sign 203, in particular to bring the vehicle 100 to a stationary state at the stop sign 203, in order to hold the vehicle 100 at the stop sign 203 and, under certain circumstances, subsequently accelerate the vehicle 100 again. In this context, the driving behavior of the vehicle 100 is influenced by the incline 201 of the roadway 202, in particular by the downgrade force which is brought about thereby on the vehicle 100. This leads, in particular in the case of a stopping process, in the case of a holding process and/or in the case of a starting up process, to adverse effects on the one-pedal-feel function and/or the creep function.

Figure 3A:
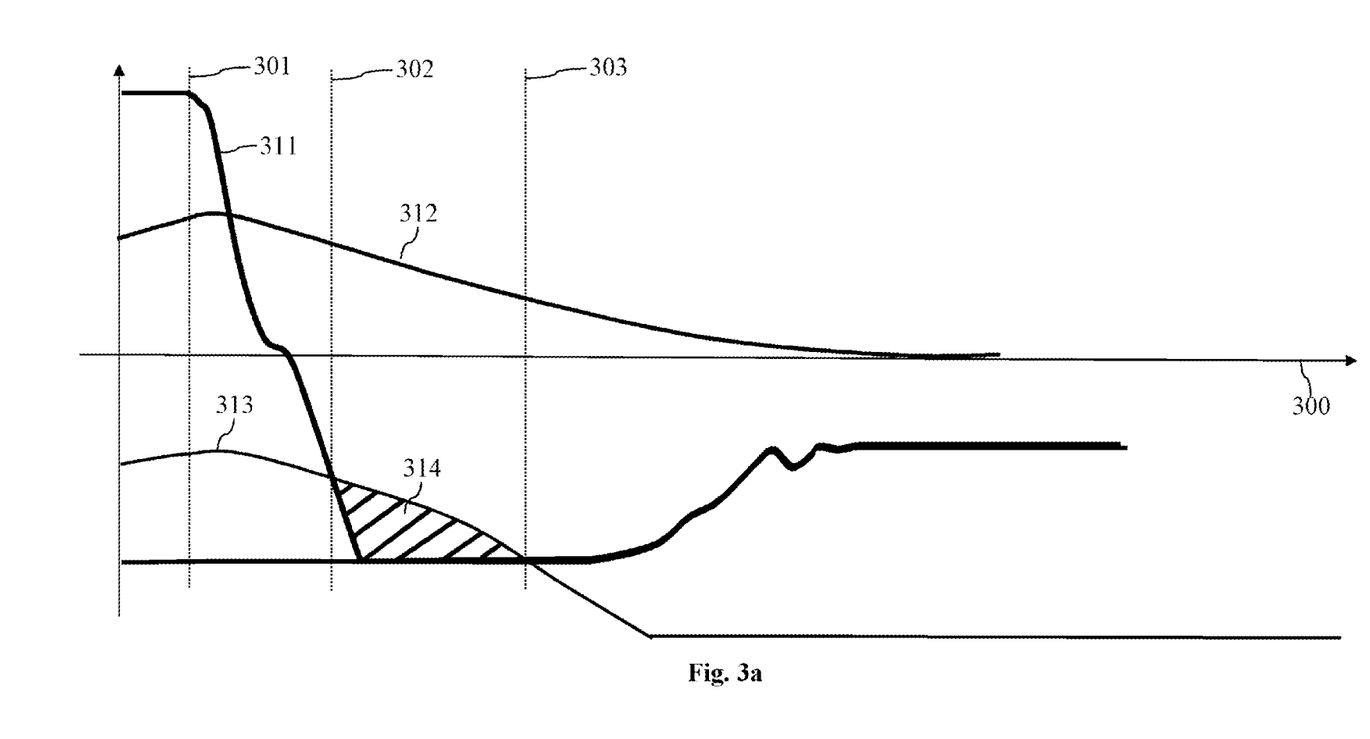
FIGS. 3a and 3b show exemplary time profiles of different operating variables of a vehicle during a stopping process, holding process and/or starting up process.

FIG. 3*a* illustrates exemplary time profiles of different vehicle variables during a stopping process of a vehicle 100 on a slope while using the one-pedal function. In particular, FIG. 3*a* shows an exemplary profile 311 of the filtered driver's request of the vehicle 100 as a function of the time 300. The filtered driver's request indicates here the (positive or negative) setpoint torque which is to be brought about on the vehicle 100 by using one or more actuators 105, 102 of the vehicle 100, e.g. in order to bring the vehicle 100 to a stationary state and/or to hold it in a stationary state.

At the time 301, the driver of the vehicle 100 takes his foot off the accelerator pedal 107 and therefore signals (within the scope of the one-pedal-feel function) that the vehicle 100 is to be brought to a stationary state. The digital driver's request (expressed by the removal of his foot from the accelerator pedal 107) can be implemented in a filtered form for reasons of comfort, in order to bring about comfortable braking of the vehicle 100. The profile 311 of the filtered driver's request indicates how the drive torque is reduced in a fluid fashion, and the (negative) deceleration torque is subsequently increased in a fluid fashion, in order to stop the vehicle 100. Finally, the profile 311 of the filtered driver's request settles at a specific constant deceleration torque, in order to compensate for the downgrade which act on the vehicle 100, and in this way to hold the vehicle 100 at a fixed position.

FIG. 3*a* shows an exemplary time profile 312 of the velocity of the vehicle 100 when the time profile 311 of the filtered driver's request is used (i.e. when the time profile 311 of the specified setpoint torque of the vehicle 100 is used).

As stated furtherabove, within the scope of a one-pedal-feel function the deceleration torque is preferably brought about by the electric machine 105 (used as a generator). In this way, when the vehicle 100 is decelerated, electrical energy can be recuperated and stored in the electrical energy store 110 of the vehicle 100. The maximum possible deceleration torque which can be provided by the electric machine 105 can depend here on one or more operating parameters of the vehicle 100. Exemplary operating parameters which can influence the maximum deceleration torque which can be provided by the electric machine 105 are:

the state of charge of the electrical energy store 110;
the maximum charging capacity of the electrical energy store 110;
the temperature of the electric machine 105;
trimming of the electric machine 105; and/or
a rotational speed of the electric machine 105.

FIG. 3*a* shows an exemplary time profile 313 of the maximum deceleration torque which can be provided by the electric machine 105. It is apparent that the maximum deceleration torque which can be provided between the times 302 and 303 is not sufficiently high to implement the filtered driver's request for the deceleration of the vehicle 100 (represented by the time profile 311). This can be the case, in particular, during a stopping process on the slope.

The control unit 101 of the vehicle 100 can be configured to detect that the maximum deceleration torque which can be made available by the electric machine 105 is not sufficient to implement the filtered driver's request within the scope of a one-pedal-feel function. It is therefore then possible to automatically activate one or more friction brakes 102 of the vehicle 100, in order to close the gap 314 between the filtered driver's request and the maximum deceleration which can be provided at least partially (preferably completely). It is therefore possible to implement a comfortable one-pedal-feel function even in the case of an inclined roadway 202.

Figure 3B:
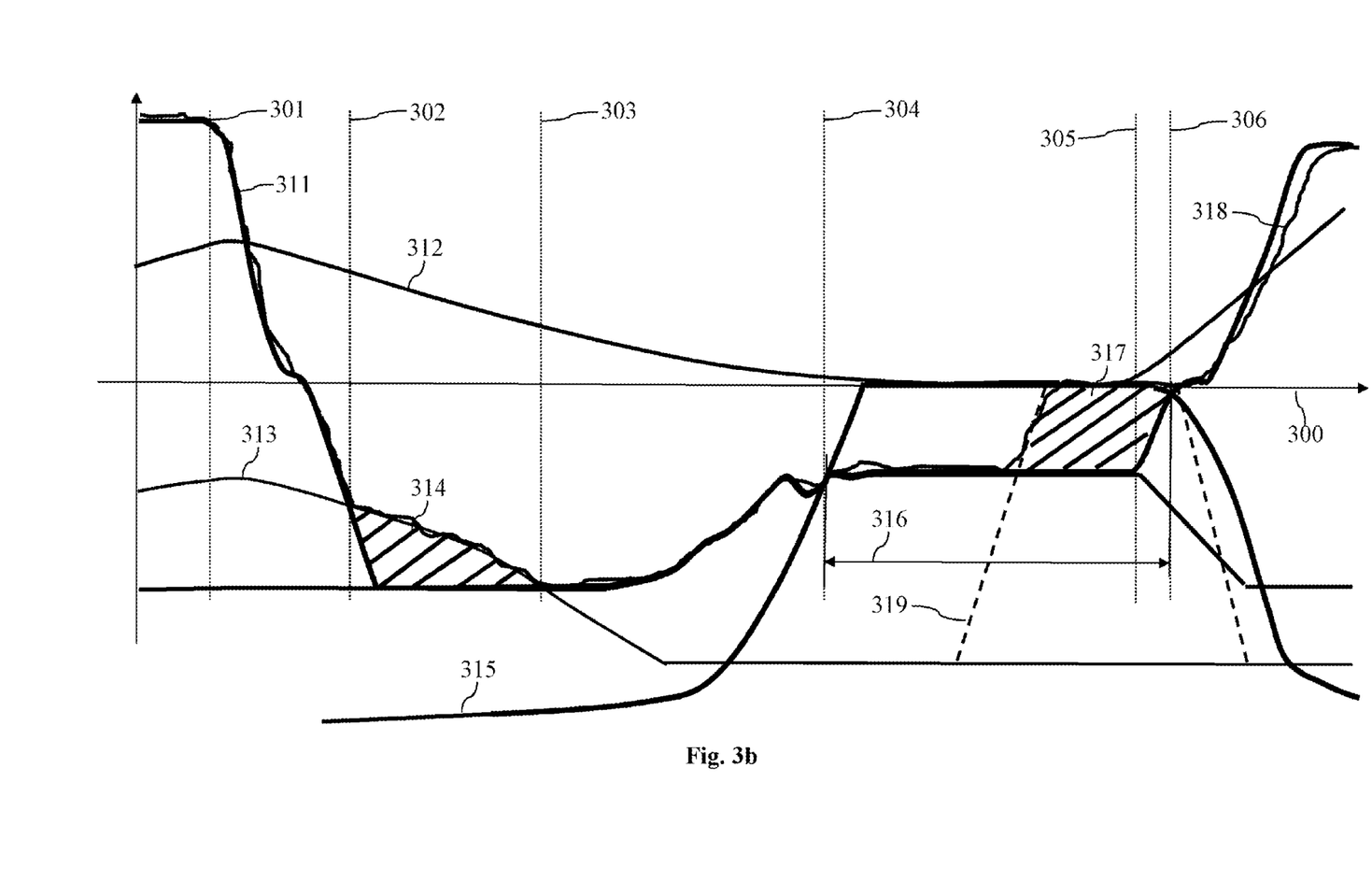

FIG. 3*b* illustrates the vehicle variables from FIG. 3*a* for a subsequent holding process and for a subsequent stopping process. As stated above, the electric machine 105 can bring about a deceleration torque which counteracts the downgrade forces on the vehicle 100, and therefore holds the vehicle 100 at a fixed position. In particular, when an externally excited electric machine 105 is used, in which electrical energy is required to generate a magnetic field in the rotor of the machine 105, the generation of a deceleration torque by the electric machine 105 in the holding state of the vehicle 100 brings about consumption of energy. Consequently, the holding of a vehicle 100 by way of the electric machine 105 brings about increased energy consumption of the vehicle 100. In order to decelerate the vehicle 100 and/or in order to hold the vehicle 100, it may therefore be advantageous, for reasons of energy efficiency, to activate the one or more friction brakes 102 of the vehicle 100 in addition to or as an alternative to the electric machine 105. Furthermore, it may not be possible to reliably ensure the holding of a vehicle 100 by way of the electric machine 105, in particular in the case of a relatively low state of charge of the electrical energy store 110. The reliability of a holding process can be increased by using the one or more friction brakes 102 of the vehicle 100.

FIG. 3b shows an exemplary efficiency curve 315 as a function of the time 300. The efficiency curve 315 shows the maximum possible deceleration torque which can be generated in an energy-efficient and/or loss-free fashion (typically as a function of the velocity of the vehicle 100). As is apparent from FIG. 3b, at the time 304 the efficient curve 315 intersects the filtered driver's request relating to the torque to be provided, so that starting from the time 304 the sole use of the electric machine 105 to provide the deceleration torque is not optimal with respect to the energy efficiency of the vehicle 100.

The control unit 101 of the vehicle 100 can be configured to detect a situation in which a deceleration torque which is to be provided can no longer at least be provided by the electric machine 105 in a way which is neutral in respect of energy. Subsequently, one or more friction brakes 102 of the vehicle 100 can be made to at least partially bring about the deceleration torque to be provided. In the example illustrated in FIG. 3b, in the area 317 the deceleration torque which is to be provided is provided by one or more friction brakes 102 of the vehicle 100. The area 317 can be arranged here in the time interval 316 between the times 304, 306, wherein in the time interval 316 the efficiency curve 315 is below the filtered driver's request (i.e. below the time profile 311).

As already stated above, the control unit 101 can be configured to activate the one or more friction brakes 102 (independently of the activation of the brake pedal 106) if it is detected that the deceleration torque which is to be provided by the electric machine 105 (said torque being represented by the profile 311) is larger in absolute value than the maximum deceleration torque which can be provided by the electric machine 105 (said torque being represented by the profile 313). In order to be able to use this function of the automatic activation of one or more brakes 102, the maximum deceleration torque which can be provided by the electric machine 105 can be artificially reduced (see profile 319), in order to bring about the activation of the one or more friction brakes 102 in the time interval 316.

FIG. 3b also illustrates the time profile 318 of the (effective) drive torques and deceleration torques which are actually brought about on the vehicle 100, during a stopping process and holding process as well as at the start of a subsequent starting up process.

This document therefore provides a description of a starting up process for a vehicle 100 with a combined use of the electric machine 105 and of the one or more friction brakes 102 of the vehicle 100. Furthermore, coasting and/or creeping which are compensated by a negative gradient can be made possible by the described measures.

The driving behavior of the vehicle 100 (in particular the deceleration profile of the vehicle 100) can therefore be optionally illustrated by a gradient compensation process such that when coasting on a roadway 202 with a positive and/or negative gradient the driving behavior of the vehicle 100 feels (essentially) for a user of the vehicle 100 like the driving behavior of the vehicle 100 on the flat. Therefore, the vehicle 100 can be made to coast to a stationary state under the control of a controller. Alternatively, the vehicle 100 can start to creep (with a creep speed) starting from a specific velocity.

The coasting and stopping of the vehicle 100 can be represented with different types or variants of a coordination process between the electric machine 105 and brakes 102:

Pure stopping of the vehicle 100 by the (sole) use of the electric machine 105 can occur without a transfer to at least one brake 102 occurring in the stationary state. Such implementation of a coasting and stopping process is particularly comfortable, in particular for the subsequent re-starting of the vehicle 100. Particular comfortable stopping and re-starting can be achieved by virtue of the fact that always the same actuator (i.e. the electric machine 105) remains in the force flux so that effects such as pitching of the vehicle 100, a change of bearing as a result of gear backlash or creaking can be avoided. On the other hand, the sole use of the electric machine 105 for a stopping process and holding process brings about, depending on the gradient of the roadway 202, relatively high thermal loading of the electric machine 105. Furthermore, the holding of the vehicle 100 by way of the electric machine 105 brings about reduced energy efficiency.

The electric machine 105 can be used to solely carry out stopping of the vehicle 100 (under certain circumstances alone). In the stationary state, there can then be partial or complete transfer to one or more brakes 102 in order to hold the vehicle 100. The time of the transfer can occur here in accordance with the positive and/or negative gradient of the roadway 202, in accordance with a setting or a preference of a user of the vehicle 100 (e.g. in accordance with the position of a driving experience switch), in accordance with the aimed-at energy efficiency and/or in accordance with a driving position of the transmission 108 of the vehicle 100. The transfer to one or more brakes 102 can bring about a comfortable stopping process and holding process. Furthermore, creaking can be avoided. On the other hand, the transfer from the electric machine 105 to at least one brake 102 can permit the mechanical holding point in the vehicle 100 to be shifted. The shifting of the holding point can be perceived by a user of the vehicle 100 in the stationary state as pitching of the vehicle 100.

Grinding or a fluid transition from the electric machine 102 to at least one brake 102 and therefore (at least temporarily) combines stopping by using the electric machine 105 and brake 102 can take place during the stopping process. It is therefore possible for pitching of the vehicle 100 to be avoided. On the other hand, relatively small adverse effects on comfort and creaking can occur here.

For the two last-mentioned variants, additional functional scopes are conceivable. In particular, the control unit 101 can make a fundamental decision as to whether there is at all to be a transfer from the electric machine 105 to a brake 102 during the stopping process and/or holding process. This decision can be made e.g. in accordance with a comfort preference (which can be defined e.g. by using a user interface of the vehicle 100 by a user of the vehicle 100). Alternatively or additionally, this decision can be determined in accordance with the intention of the driver with respect to the further profile of the travel of the vehicle 100. The intention of the driver can be ascertained e.g. on the basis of traffic data relating to the traffic environment of the vehicle.

Furthermore, the control unit 101 can be configured to make a decision as to when there is at all to be a transfer from the electric machine 105 to a brake 102. In this context, one or more objectives relating to the efficiency and/or the comfort of the vehicle 100 can be taken into account (which objectives can be defined e.g. by a driver of the vehicle 100 via a user interface of the vehicle 100). Furthermore, the control unit 101 can be configured to define an implementation of the transition between the electric machine 105 and at least one brake 102. In this context, it is possible to define, in particular, one or more time transfer gradients, e.g. to avoid pitching and/or creaking and/or to optimize the safety and/or the comfort.

The vehicle 100 is preferably configured in such a way that when the electromotive holding torques are degraded or fail there is a transfer under close to real time conditions to the brake system. Alternatively or additionally, when necessary (e.g. when the driver gets out of the vehicle or when there is a functional failure in the vehicle 100) a secured stationary state of the vehicle 100 can be brought about by a parking brake system of the vehicle 100 and/or by activating the gearshift interlock of the transmission 108 of the vehicle 100. The parking brake and/or the gearshift interlock can, under certain circumstances, be activated automatically here by the control unit 101 if the requirement for this has been detected.

Furthermore, within the scope of a one-pedal-feel function and/or a creep function the starting process of a vehicle 100 can also take place with an electric machine-brake coordination process. In this context, when starting in the motor-operated range it is possible to avoid bearing shocks in the gear backlash by pretensioning the electric machine 105 when the brake 102 is active. In particular, the drive torque of the electric machine 105 can, under certain circumstances, not be built up until the (filtered) driver's request has exited the generator range when the necessary braking torque is reduced. The total torque composed of the torque of the electric machine 105 and the torque of the one or more brakes 102 then corresponds to the profile 311 of the filtered driver's request.

Alternatively or additionally, a vehicle-in-front coupling can occur at a vehicle in front which is arranged ahead of the vehicle 100. In particular, during a starting up process relatively early transfer from the brake 102 to the electric machine 105 can occur as soon as the driving off of the vehicle in front has been detected. In this way it is possible to increase the comfort and the reactivity of the vehicle 100.

Alternatively or additionally, when the vehicle 100 starts up in the generator range of the electric machine 105 (in particular when traveling down hill), back-coordination can occur from a brake 102 to the electric machine 105 within the overrun range of the vehicle 100, in order to increase the comfort of the starting up process. It is therefore possible, during a starting up process, to transfer the deceleration of the vehicle 100 from the brake 102 to the electric machine 105, in particular in order to increase the comfort and/or the energy efficiency of a starting up process.

For the overrun range up to the point where a specific velocity of the vehicle 100 is exceeded, it is, under certain circumstances, also possible to actuate at least one brake 102 of the vehicle 100 in order to decelerate the vehicle 100. The dosing of the brake pressure of the at least one brake 102 occurs here in accordance with the driver's request, on the basis of the deflection of the accelerator pedal 107.

As already stated above, electrical energy is required to generate a magnetic field in the rotor in the case of an externally excited electric machine 105. If the vehicle 100 is operated to a stationary state with recuperation, this can bring about a negative energy balance for the electrical energy storage 110. Through simulations it is possible to acquire a continuous torque and/or efficiency curve 315 which represents, as a boundary line, a positive or negative energy balance of the recuperation. The torque and/or efficiency curve 315 can depend on the machine trimming of the electric machine 105, on the temperature, on the recuperation level, on the speed and/or on the rotational speed of the electric machine 105, on one or more necessary secondary consumers, on the power consumption of the electric machine 105 and/or on the power consumption of the one or more brakes 102 (for the compensation of the torque of the electric machine 105).

The control unit 101 can be configured to take into account the torque and/or efficiency curve 315 for the operation of the electric machine 105 and/or of the one or more brakes 102, in particular to decide whether the electric machine 105 and/or whether the one or more brakes 102 are to be used to provide a braking torque.

A dosed creep function can be implemented efficiently without using the one or more brakes 102. Nevertheless, the metering or the changing of the creep speed can be performed by a driver of the vehicle 100 using (under certain circumstances solely) the brake pedal 106. The electric machine 102 can generate for this purpose torques which assume values between the creeping torque and the holding torque or a minimum torque.

The creeping can be implemented in such a way that when the brake pedal 106 is activated the drive torque of the electric machine 105 is firstly reduced in a dosable fashion. Only when a minimum EM torque of the electric machine 105 is reached (wherein the minimum EM torque or the minimum torque can be dependent on the electric machine 105 and/or on the inclination 201 of the roadway 202), can a brake pressure be built up in order to reduce the creep speed further. When the creeping is metered by way of the brake pedal 106, but without building up a brake pressure in the one or more brakes 102, the torque which is brought about by the electric machine 105 can assume values of a creeping torque up to a holding torque. From the point when the holding torque is reached (at which torque the vehicle 100 has come to a stationary state), the abovementioned situation of a stopping process without creeping is present. A transfer to at least one brake 102 can then occur, as stated above.

In particular in the case of a brake-by-wire brake system, even in the case of relatively strong activation of the brake pedal 106 it is possible to suppress actual contact of the brake linings of the one or more brakes 102 for a relatively short holding period, which is, in particular, not damaging either in respect of efficiency or thermal loading of the electric machine 105. This suppression can be brought about by virtue of the fact that the one or more wheel brakes 102 remain free until restarting occurs, which contributes to the fact that the friction-induced residual braking torque is reduced for the subsequently travel phase of the vehicle 100, meaning that less energy is consumed. In this expanded approach, the one or more wheel brakes 102 would not be applied and pretensioned until there is relatively strong activation of the brake pedal 106 (above a specific deflection of the brake pedal 106).

Alternatively or additionally, negative gradient compensation can occur for coasting and creeping of a vehicle 100. Within the scope of a one-pedal-feel function the recuperation torque of the electric machine 105 can be reduced below a specific velocity (e.g. at 8 km/h or less) as far as the stationary state of the vehicle 100, e.g. can be reduced in a linear fashion. Therefore, a vehicle 100 comes gently to a stop on the flat. However, even with a slight negative gradient 201 of the roadway 202 a state of equilibrium occurs composed of downgrade force and recuperation torque, so that the vehicle 100 slowly continues rolling downward. Conversely, on a positive gradient the vehicle 100 rolls back slowly counter to the desired direction of travel after the stationary point of the vehicle 100 has been passed through in an oscillating fashion.

A negative gradient compensation process can avoid this effect by calculating a directional compensation torque for the downgrade force using an inclination estimator of the vehicle 100 and is applied additively to the electric machine torque in the abovementioned speed range of the reduction of the electric machine torque. The inclination estimator can be configured to acquire the inclination 201 of the roadway 202 from a calculated torque balance of the drive and/or by using a longitudinal acceleration sensor 103. By taking into account the directional compensation torque it is possible to reliably ensure that even in the case of a roadway 202 which is not horizontal the vehicle 100 coasts to a standstill and comes to a stop as if the vehicle 100 were moving on a horizontal plane. In the stationary state of the vehicle 202 it is then, under certain circumstances, possible to transfer to the one or more brakes 102 of the vehicle 100 in order to hold the vehicle 202 at a fixed position.

The compensation of the inclination 201 within the scope of a one-pedal-feel function and/or within the scope of a creep function can be limited to a limited range of inclinations 201 (e.g. between −5% and 5%). Outside the limitation range it is possible, under certain circumstances, to dispense with compensation of the inclination 201. It is therefore possible to avoid a synthetically acting coasting behavior. For the same reason it may be advantageous to carry out no or only a small negative gradient compensation process above the abovementioned limiting speed for the reduction of the electric machine torque. The compensation of the inclination 201 of a roadway 202 can therefore be limited to a specific speed range (e.g. of 10 km/h or less, or of 7 km/h or less).

Figure 4:
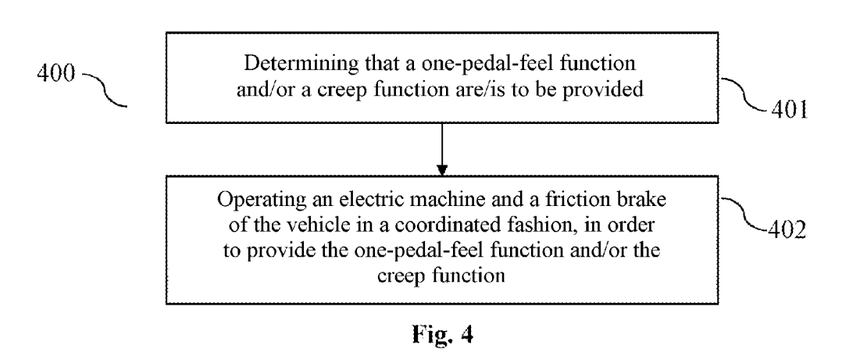
FIG. 4 shows a flow diagram of an exemplary method for operating a vehicle.

FIG. 4 shows a flow diagram of an exemplary method 400 for operating a motor vehicle 100, wherein the motor vehicle 100 comprises at least one electric machine 105 for driving one or more wheels 109 of the vehicle 100 and at least one friction brake 102. In particular, the vehicle 100 can be configured to be driven at least at certain times solely by way of the electric machine 105. The method 400 can relate to a time period during which the vehicle 100 is driven purely electrically and/or solely by way of the at least one electric machine 105.

The method 400 can be configured to provide a one-pedal-feel function and/or a creep function in the vehicle 100, in particular when the vehicle 100 is driven or operated purely electrically by way of the at least one electric machine 105. Within the scope of the one-pedal-feel function, the vehicle 100 can be accelerated and decelerated by a driver of the vehicle 100 solely by way of the accelerator pedal 107 of the vehicle 100. Within the scope of the creep function, the velocity of the vehicle 100 can be reduced, starting from a relatively low creep speed (e.g. of 8 km/h or less) solely by activating the brake pedal 106 of the vehicle 100 and, under certain circumstances, again increased up to the creep speed.

The method 400 comprises determining 401 that the one-pedal-feel function is to be provided via the accelerator pedal 107 of the vehicle 100, and/or the creep function is to be provided via the brake pedal 106 of the vehicle 100. For example, the driver of the vehicle 100 may have made a setting, via the user interface of the vehicle 100 (e.g. by using a switch), that the one-pedal-feel function and/or the creep function is to be provided.

Furthermore, the method 400 comprises operating 402 the electric machine 105 and the friction brake 102 in combination and/or in a coordinated fashion at least for a certain time, in order to provide the one-pedal-feel function and/or the creep function. In particular, in order to provide the one-pedal function both the electric machine 105 and the friction brake 102 can be used at least for a certain time, even though the driver of the vehicle 100 only uses the accelerator pedal 107 to change the velocity of the vehicle 100 (without activating the brake pedal 106). Alternatively or additionally, in order to provide the creep function (under certain circumstances along with the friction brake 102) by activating the brake pedal 106 (without activating the accelerator pedal 107), it is possible to bring about a change in the torque (drive torque or deceleration torque) brought about by the electric machine 105, in order to change the creep speed of the vehicle 100.

The control unit 101 of a motor vehicle 100 can be configured to implement, in particular within the scope of a creep function and/or a one-pedal-feel function, one or more of the following measures:

If the driving position B (operation of the vehicle 100 with engine brake) is switched over to the driving position D (drive) or R (reverse) in the stationary state of the vehicle 100, the electric machine 105 and/or the friction brake 102 can be operated in such a way that immediate creeping away without activation of the accelerator pedal 107 and/or of the brake pedal 106 is avoided. In the event of the vehicle 100 being held by the electric machine 105, the vehicle 100 can then be held by the friction brake 102 immediately after the switching over of the driving position to D or R. The electric machine 105 can be relieved of loading here. The starting of creeping of the vehicle 100 and/or the relieving of loading on the electric machine 105 are/is preferably slowed down until the brake 102 securely holds the vehicle 100. The starting of creeping preferably occurs only at the activation of the accelerator pedal 107 or of the brake and/or of the brake pedal 105.

In order to model the creeping behavior of a vehicle 100 with converter transmission in a BEV 100, the creeping torque can be provided constantly as far as a stationary state, against the service brake with the brake pedal 106 activated. In order to increase the energy efficiency, the creeping torque which is brought about by the electric machine 105 can be lowered with increasing activation of the brake pedal. Insofar as a brake system which can prevent the build up of brake pressure when the brake pedal 106 is activated is installed in the vehicle 100, a reduction in the creeping torque brought about by the electric machine 105 can also occur with increasing activation of the brake pedal. Therefore, the propulsion can be metered by activating the brake pedal 106 purely by way of the reduction of traction in the drive.

Pulling of the vehicle 100 by the drive counter to the deceleration of the vehicle 100 by the brake 102 can, under certain circumstances, be eliminated.

Through the abovementioned measure it is possible to ensure that a vehicle 100 with an automatic transmission can be dosed exclusively with the brake pedal 106 below the creep speed (and below the creeping torque). In this context, the service brake holds against the transmitted torque of the converter or the slipping clutch (given a corresponding vehicle with a combustion engine). The minimum torque which the drive transmits here results from the torque which is provided during idling, in order to hold the idling, and from the transmitted torque (including the converter increase) of the clutch or of the converter.

When the brake pedal 106 is released in the stationary state, rolling against the direction of travel is to be prevented. If the vehicle 100 is held by way of the brake 102, the brake system 102 of the vehicle 100 can hold the vehicle 100 until the drive has built up sufficient wheel torque in order to protect the vehicle 100 against rolling counter to the direction of travel.

Above a certain critical positive gradient 201 (depending on the weight of the vehicle 100 and the type of vehicle), the (maximum) creeping torque is typically no longer sufficient to protect the vehicle 100 before the rolling counter to the direction of travel. In this operating range a creeping torque is preferably no longer implemented. The vehicle 100 can then continue to be held by the brake 102.

Below the critical positive gradient 201 (the vehicle 100 can, under certain circumstances, start to roll in this case), the control unit 101 can cause a creeping torque to be increased as the brake pedal pressure is reduced. The creeping torque is preferably sufficiently high here for the brake 102 to be able to be opened.

The starting of creeping can therefore, under certain circumstances, be activated or made possible only below a certain positive gradient 201. This makes it possible to avoid insufficiently high creeping torques being brought about. The creeping torque would typically no longer be sufficient above a certain positive gradient 201 to hold the vehicle 100 and therefore also not lead to the starting of creeping. The gradient 201 of a roadway 202 can be acquired, in particular, with relatively high accuracy in a stationary state so that the deactivation or activation of the provision of a creeping torque can be made possible in a precise way.

The control unit 101 can be configured to decelerate the vehicle 100 in the driving position B as far as the stationary state even before the pedals 106, 107 remain unactivated. The vehicle 100 can in this case be held automatically in a stationary state. If switching over occurs to the driving position D or R, it is possible, for reasons of controllability, for the starting of creeping to occur under certain circumstances only after the pedal arrangement 106, 107 has been activated. This can avoid unexpected rolling away after a change of driving position.

The control unit 101 can be designed to permit a changeover into the one or more driving positions in which the vehicle 100 automatically creeps (e.g. the driving positions D and R) out of the driving positions in which driving cannot occur (e.g. the driving positions N and P), if appropriate only when the brake pedal 106 is depressed (under certain circumstances given a velocity below a specific creep speed). At higher velocities, it is possible, under certain circumstances, for a changeover to be made possible even without activating the brake pedal 106.

If creeping occurs continuously against an obstacle (e.g. a positive gradient 201, a curbstone, etc.), the vehicle 100 remains still but nevertheless a torque is generated and therefore energy is applied, without the vehicle 100 moving. This can lead to a situation in which the energy store 110 is emptied. The control unit 101 can be configured to detect that the state of charge of the energy store 110 has dropped below a state-of-charge threshold value and/or that the energy store has been degraded. In reaction to this, the friction brake 102 and/or the parking brake can be activated in order to arrest the vehicle 100. Furthermore, a message can be issued to a driver of the vehicle 100 in order to alert the driver to this situation.

The control unit 101 can be configured to activate the brake 102 of the vehicle 100 automatically as soon as the stationary state of the vehicle 100 is detected.

Within the scope of a one-pedal-feel function, the BEV 100 can move selectively into a stationary state if the following conditions are satisfied:
- no activated brake pedal 106;
- accelerator pedal=0%;
- velocity v below a limiting speed (e.g. 8 km/h);
- reaching up to a maximum recuperation torque of the vehicle 100; and/or
- positive gradient/negative gradient 201 below a limiting inclination (e.g. 12%, specific to the vehicle).

In the speed range above the limiting speed (e.g. for v>8 km/h), the vehicle 100 can be designed always to decelerate in the same way (with the same deceleration torque). If appropriate, the deceleration can occur above the limiting speed (e.g. 8 km/h) with a relatively gentle positive gradient compensation process. In this context, the deceleration is preferably not controlled but instead only the deceleration torque is adapted on the basis of the positive gradient 201. The positive gradient compensation process is preferably carried out only up to a specific limiting inclination (e.g. of approximately 12%).

The deceleration torque which is provided in the case of deceleration and in the case of a targeted stopping process, is preferably limited in order to bring about reliable and safe deceleration. In order to increase the driving comfort, deceleration and stopping are preferably carried out with the electric machine 105. The stopping process can take place with the service brake 102, with the electric brake 105 or with a combination of the two assemblies. The proportion of deceleration by the brake 102 can be set as a function of the negative gradient or the positive gradient 201. In this context, the portion of the brake 102 typically increases as the absolute value of the inclination 201 rises.

In the driving position B, the vehicle 100 preferably does not start up until the accelerator pedal 107 is activated. If the accelerator pedal 107 is activated in a stationary state, the drive is preferably operated in such a way that when starting up occurs on a negative gradient and on the flat no idle travel occurs at the acceleration pedal 107 (i.e. no activation of the accelerator pedal without a longitudinal dynamic response of the vehicle 100 occurs). The drive is preferably operated in such a way that the starting up occurs via the accelerator pedal 107 has a similar feel under the different conditions (in particular given different inclinations 201). An increased acceleration in the negative gradient is preferably avoided. The compensation of a negative gradient is preferably carried out only up to a maximum (non-degraded) recuperation torque of the drive 105. In the case of a positive gradient, it is possible, under certain circumstances, for idle travel to occur at the accelerator pedal 107 until the wheel torque is high enough under traction to automatically hold the vehicle 100 or accelerate it in the direction of travel.

If the vehicle 100 is held only with the electric machine 105 and the accelerator pedal 107 is activated, it can be ensured that the starting up takes place purely via the electric machine 105. The acceleration can be controlled here, under certain circumstances, solely via the electric machine 105.

If the vehicle 100 is held with the brake 102 on a positive gradient 201, it is possible, under certain circumstances, to ensure that the drive applies sufficient torque in the direction of travel so that the brake 102 opens (i.e. that the torque balance is positive, so that the vehicle 100 does not roll backwards). In this context, an idle travel can occur at the accelerator pedal 107 until the driver's request which corresponds to the accelerator pedal 107 supplies enough torque for starting up. In order to avoid shocks during the change of bearing (as a result of play in the transmission), the drive can be brought into abutment in the setpoint direction of travel during the holding with the brake 102.

Dosed starting up on a negative gradient can be brought about by the fact that the electric machine 105 provides torque counter to the direction of travel (that is to say acts counter to the downgrade force). If it is detected that there is a limitation in the electric drive system and/or that the electric machine 105 cannot provide enough torque counter to the direction of travel, the one or more friction brakes 102 are made to compensate for the lack of deceleration.

If the vehicle 100 is held on the negative gradient by way of the brake 102, it can then be reliably ensured that the vehicle 100 does not roll counter to the direction of travel. However, opening the brake 102 when the accelerator pedal is activated would cause the vehicle 100 to roll away downhill in the direction of travel. Dosed starting up by way of the brake 102 could cause relatively loud brake noises. The control unit 101 can therefore be configured, in the event of a negative gradient being detected, to bring about starting up via the electric machine 105. For this purpose, firstly a (relatively fast) transfer can occur from "holding with brake 102" to "holding with electric machine 105". Subsequently, starting up can occur with the electric machine 105 (if appropriate including compensation of the negative gradient).

Starting from the driving position B, switching over into the driving position N can, under certain circumstances, always be made possible. In the stationary state, the vehicle 100 is typically held automatically in the driving position B (in order to avoid rolling away). The switching over from the driving position B into the driving position N can bring about immediate holding (solely) with the brake 102 in a stationary state. By activating the brake pedal 106 and releasing it again it is possible, under certain circumstances, to ensure that the vehicle 100 can roll freely.

The holding of the vehicle 100 is preferably only activated starting from the stationary state of the vehicle. Starting from the occurrence of the stationary state of the vehicle it can be ensured that the vehicle 100 no longer moves without activation of the accelerator pedal (i.e. the vehicle 100 is held).

If the vehicle 100 is decelerated into a stationary state with compensation in the driving position B (by way of a combination of recuperation and a friction brake 102), it can be ensured that, starting from the occurrence of a stationary state, the vehicle 100 is held (under certain circumstances solely with the brake 102). The transfer to the friction brake 102 can occur here in such a way that a specific compromise between energy efficiency and driving comfort is achieved as a function of a driving mode of the vehicle 100 and/or as a function of a drive configuration of the vehicle 100.

If the vehicle 100 is decelerated into a stationary state only with the electric machine 105 on a negative gradient or on the flat, it can be assumed that the vehicle 100 can also be held via the electric machine 105. It can therefore be ensured that starting from the occurrence of the stationary state the vehicle 100 is held only with the electric machine 105.

After a certain time, a transfer to the brake 102 can occur, so that starting from then the vehicle 100 is held hydraulically by the brake 102. The torque of the electric machine 105 can then be reduced (imperceptible to the driver). The time period after which the brake 102 assumes the function of holding the vehicle 100 can be dependent on the positive gradient 201. As the positive gradient 201 increases, the time period can, under certain circumstances, be shortened.

The vehicle 100 can be designed to be held automatically in the driving position B both in and also counter to the setpoint direction of travel (by way of the electric machine 105), without the brake 102 being activated.

If a door of the vehicle 100 is opened during the holding with the electric machine 105, it can be ensured that the holding of the vehicle 100 is transferred automatically to a service brake 102 and/or to a parking brake of the vehicle 100.

The control unit 101 can be configured to avoid, in reaction to a changeover of the driving position from B to D/R, immediate creeping away without activation of the pedal arrangement 106, 107 of the vehicle 100. In the event of the vehicle 100 being held by way of the electric machine 105, it can be ensured that the vehicle 100 is held (under certain circumstances solely) by the brake 102 immediately after the switching over the driving position to D or R. The electric machine 105 is then relieved of loading. The starting of creeping and/or the relieving of the electric machine 105 can be slowed down here until the brake 102 securely holds the vehicle. The starting of creeping preferably occurs only with the activation of the accelerator pedal 107 and/or of the brake pedal 106 of the vehicle 100.

As a result of the measures which are described in this document, the energy efficiency and/or the comfort of an at least partially electrically driven vehicle 100 can be increased, in particular with respect to a one-pedal-feel function and/or with respect to a creep function. Furthermore, the safety of a vehicle 100 can be increased during a stopping process, holding process, creeping process and/or starting up process.

The present invention is not limited to the exemplary embodiments shown. It is in particular to be noted that the description and the figures are intended to illustrate only the principle of the proposed methods, devices and systems.

What is claimed is:

1. A control unit for a vehicle which comprises at least one electric machine for driving one or more wheels of the vehicle and at least one friction brake; wherein the control unit is configured to:
   determine that a one-pedal-feel function is to be provided via an accelerator pedal of the vehicle,
   determine that a creep function is to be provided via a brake pedal of the vehicle;
   operate the electric machine and the friction brake in combination at least at certain times, in order to provide the one-pedal-feel function and the creep function;
   acquire inclination information relating to an inclination of a roadway which is traveled on by the vehicle; and
   operate at least one of the electric machine or the friction brake in accordance with the inclination information, in order to provide at least one of the one-pedal-feel function or the creep function.

2. The control unit according to claim 1, wherein the control unit is further configured to operate the at least one of the electric machine or the friction brake in such a way that the inclination of the roadway is at least partially compensated during the operation of the one-pedal-feel function or the creep.

3. The control unit according to claim 1, wherein the control unit is further configured to, at least one of:
   operate at least one of the electric machine or the friction brake within a scope of the creep function in accordance with the inclination information in such a way that when the accelerator pedal is not activated and the brake pedal is not activated, the vehicle travels at a creep speed independently of the inclination of the roadway, at least in a limited inclination range; or
   operate at least one of the electric machine or the friction brake within a scope of the one-pedal-feel function in accordance with the inclination information in such a way that when the brake pedal is not activated, the vehicle is decelerated to a stationary state and held in a stationary state, at least in the limited inclination range, when the driver takes a foot off the accelerator pedal.

4. The control unit according to claim 1, wherein, in order to provide the one-pedal-feel function, the control unit is further configured to:
   acquire deflection information relating to a deflection of the accelerator pedal of the vehicle;
   determine, based on the deflection information, that the vehicle is to be decelerated; and
   operate at least one of the electric machine or the friction brake in order to decelerate the vehicle.

5. The control unit according to claim 4, wherein the control unit is further configured to:
   acquire, in accordance with the deflection information, a setpoint deceleration torque which is to be provided within the scope of the one-pedal-feel function;
   determine that, for at least one of a technical reason or for an efficiency reason, the setpoint deceleration torque can at least partially not be provided by the electric machine; and
   in reaction to the determining cause the friction brake to bring about a braking torque in order to at least partially make available a portion of the setpoint deceleration torque which, for the at least one of the technical reason or for the efficiency reason, cannot be provided by the electric machine.

6. The control unit according to claim 4, wherein the control unit is further configured to:
   determine, based on the deflection information, that the vehicle is to be decelerated to a stationary state;
   acquire a time profile of a setpoint torque which is to be provided over time by at least one of the electric machine or by the friction brake, in order to decelerate the vehicle to the stationary state;
   acquire at least one of a first time profile of a deceleration torque which is to be technically provided by the electric machine, or a second time profile of a deceleration torque which is to be provided in an energy-efficient fashion by the electric machine; and
   determine, in accordance with the time profile of the setpoint torque and in accordance with at least one of the first time profile or the second time profile, one or more time intervals in which the friction brake is activated in addition to the electric machine or as an alternative to the electric machine, in order to bring the vehicle to a stationary state or to hold it in the stationary state.

7. The control unit according to claim 4, wherein, in order to provide the creep function, the control unit is further configured to:
   acquire the deflection information relating to the deflection of the brake pedal of the vehicle; and
   change, in accordance with the deflection information, a drive torque, provided by the electric machine, between a creep torque, during which the vehicle has a maximum possible creep speed, and a minimum torque, during which the vehicle has a reduced velocity in comparison with the maximum possible creep speed, or is stationary.

8. The control unit according to claim 7, wherein the control unit is further configured not to activate the friction brake to generate a braking torque until the deflection information indicates that
   the vehicle is to travel more slowly than at the velocity which can be reached with the minimum torque; or
   the vehicle is to be held in a stationary state.

9. The control unit according to claim 1, wherein during the certain times, the at least one friction brake is controlled in such a way that activation of the brake pedal does not activate the at least one friction brake.

10. A control unit for a vehicle which comprises at least one electric machine for driving one or more wheels of the vehicle and at least one friction brake; wherein the control unit is configured to:
    determine that a one-pedal-feel function is to be provided via an accelerator pedal of the vehicle,
    determine that a creep function is to be provided via a brake pedal of the vehicle;
    operate the electric machine and the friction brake in combination at least at certain times, in order to provide the one-pedal-feel function and the creep function;
    predict a time at which a driver of the vehicle will activate the accelerator pedal again in order to accelerate the vehicle again starting from a stationary state of the vehicle; and at least one of:
    use the friction brake in accordance with the predicted time to at least one of transfer the vehicle into the stationary state or hold the vehicle in the stationary state; and
    determine, in accordance with the predicted time, whether to at least one of transfer at least partially from the electric machine to the friction brake or to acquire a time at which blending back occurs again from the friction brake to the electric machine.

11. A control unit for a vehicle which comprises at least one electric machine for driving one or more wheels of the vehicle and at least one friction brake; wherein the control unit is configured to:
    determine that a one-pedal-feel function is to be provided via an accelerator pedal of the vehicle,
    determine that a creep function is to be provided via a brake pedal of the vehicle;
    operate the electric machine and the friction brake in combination at least at certain times, in order to provide the one-pedal-feel function and the creep function;
    acquire user information relating to a user of the vehicle; wherein the user information indicates at least one of:
    whether the user of the vehicle would like to use at least one of the one-pedal-feel function or the creep function;

an intention of the user of the vehicle relating to a future driving maneuver; or a preference of the user relating to the energy efficiency or comfort; and operate the electric machine and the friction brake in accordance with the user information in order to provide at least one of the one-pedal-feel function or the creep function.

* * * * *